Nov. 7, 1967  E. N. BARKER  3,351,414
ANIMATORS FOR CAMERAS
Filed Jan. 21, 1965  2 Sheets-Sheet 1
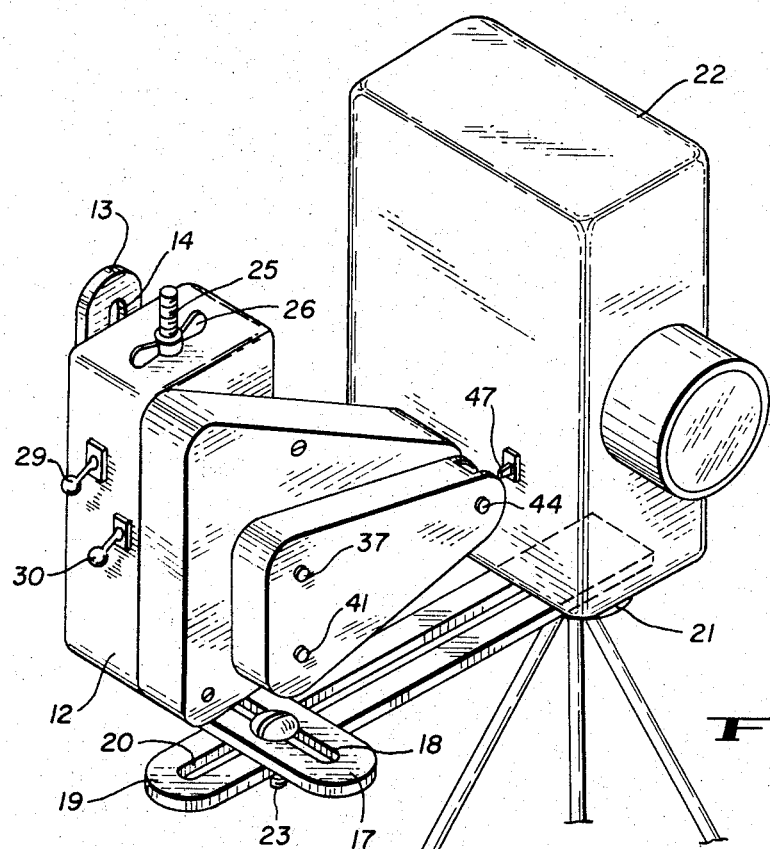
Fig_1
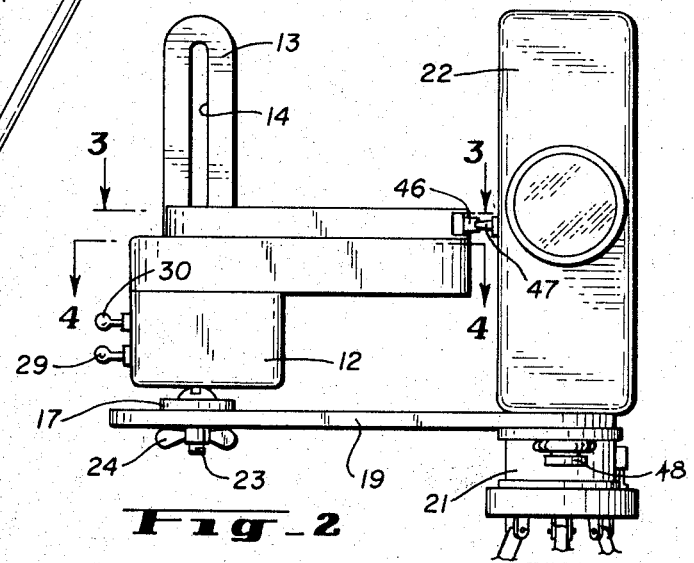
Fig_2
INVENTOR.
Ellis N. Barker
BY
ATTORNEY

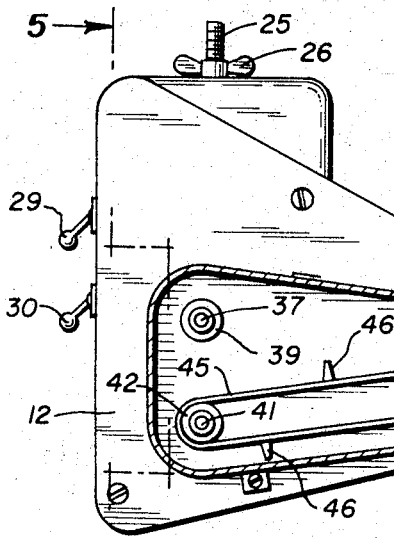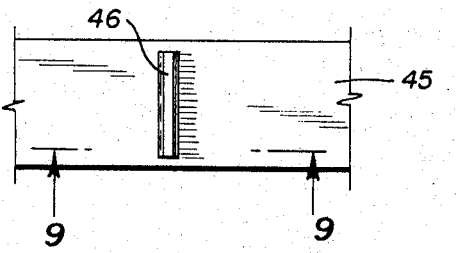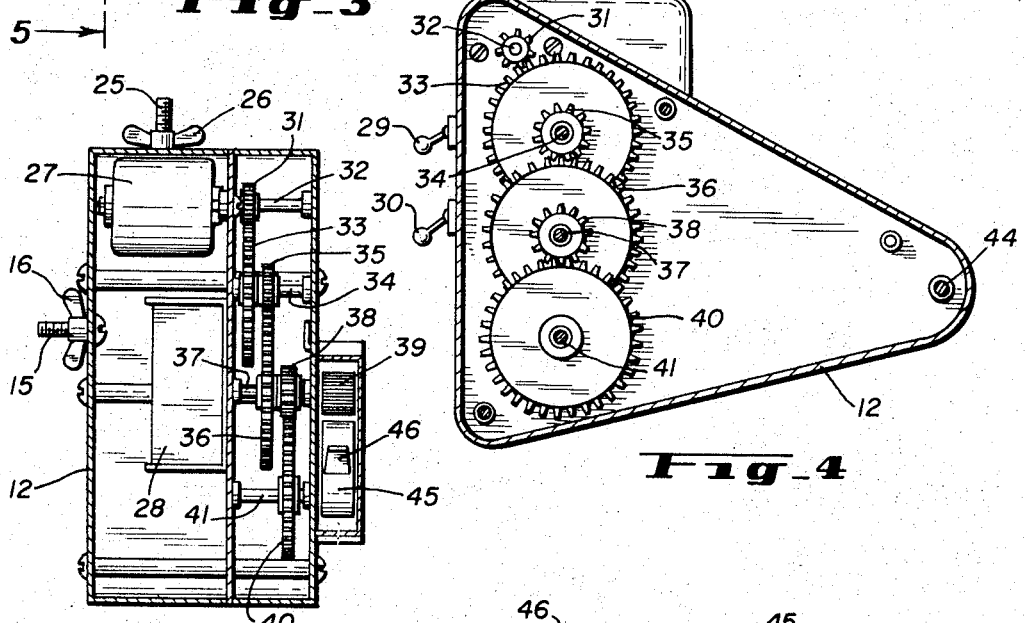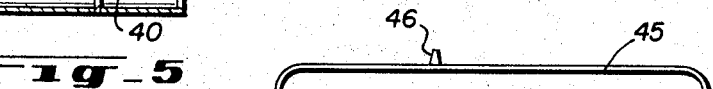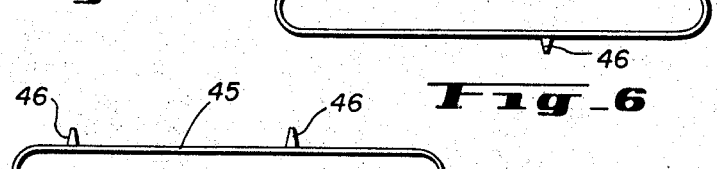

United States Patent Office 3,351,414
Patented Nov. 7, 1967

3,351,414
ANIMATORS FOR CAMERAS
Ellis N. Barker, 2670 S. Williams,
Denver, Colo. 80210
Filed Jan. 21, 1965, Ser. No. 426,917
1 Claim. (Cl. 352—84)

ABSTRACT OF THE DISCLOSURE

A camera animator having an endless belt with projections which periodically engage the trigger of a camera to intermittently expose the film in the camera.

The present invention relates to motion picture cameras and more particularly to automatic animators for motion picture cameras. Such an animator greatly increases the usefulness of a motion picture camera equipped for animating. On such occasions as it is desired to take sequences of a scene at spaced intervals, the camera may be focused on the scene and left unattended and the animator will activate the camera at such intervals as may be predetermined. The exposed and developed film when subsequently run through a projector will project the pictures taken at the various intervals and present an animated series of pictures having continuity.

It is an object of the invention to provide an animator for a camera which may be mounted on the same tripod as the camera and positioned to actuate the trigger of the camera.

It is another object to provide a camera animator which may be readily adaptable to cameras having their switches located in various positions.

A further object is to provide a camera animator which may be operated by a constant speed motor and which will activate a camera at a wide range of intervals.

With these and various other objects in view, the invention may consist of certain novel features, as will be more fully described and particularly pointed out in the specification, drawings and claims appended hereto.

In the drawings, in which like characters are used to designate like parts:

FIG. 1 is a perspective view of an animator mounted on a tripod and positioned to actuate a camera.

FIG. 2 is a front elevation of the animator and camera shown in FIG. 1 with the animator in a horizontal position.

FIG. 3 is a cross section of the animator taken on the line 3—3 of FIG. 2.

FIG. 4 is a cross section taken on line 4—4 of FIG. 2.

FIG. 5 is a cross section of the animator taken on the line 5—5 of FIG. 3.

FIG. 6 is a side elevation of a drive belt having two activating fingers.

FIG. 7 is a side elevation of a drive belt having four activating fingers.

FIG. 8 is an enlarged fragmentary top plan view of a drive belt.

FIG. 9 is a cross section of the drive belt shown in FIG. 8 taken on the line 9—9.

Referring more particularly to the drawings, the assembly comprises an animator housing indicated generally at 12. As shown in FIG. 1, the animator is shown in a vertical position secured to the vertically positioned portion 13 of an L-shaped bracket through a slotted portion indicated at 14 by a wing nut 16 and bolt 15 shown in FIG. 5. The horizontal portion 17 of the L-shaped bracket is slotted at 18 and is secured to the straight arm 19 through its slotted portion 20. The arm 19 has one end secured at 48 to the tripod platform 21 on which the camera 22 is mounted. The bolt 23 secured by the wing nut 24 passes through the slots 18 and 20 of the arms 17 and 19 permitting the adjustment of the relative position of the arms.

In FIG. 2 the animator is shown in a horizontal position and secured to the vertical portion 13 of the L bracket through the slotted portion 14 by the bolt 25 and wing nut 26.

The animator housing 12 contains an electric motor 27 which is powered by a battery 28 and connected to it through a switch 29 which turns it off and on and a switch 30 which causes the rotation of the motor to be reversed. The rear 31 is mounted on the shaft 32 which is driven by the motor 27. The gear 31 is meshed with the larger gear 33 which is mounted on the shaft 34 adjacent gear 35 and is rotatable with it. The gear 35 is meshed with the larger gear 36 which is mounted on the shaft 37 adjacent gear 38. A driving pulley 39 is mounted on the shaft 37 and is rotatable with it.

The gear 38 is meshed with larger gear 40 which is mounted on the shaft 41. A driving pulley 42 is mounted on the shaft 41 adjacent gear 40. An idler pulley 43 is mounted on shaft 44. As shown in FIG. 3, a belt of the timing type 45 having activating fingers 46 is mounted on idler pulley 43 and driving pulley 42. Details of the belt are shown in FIGS. 6, 7, 8 and 9. The number of fingers and their spacing on the belt will determine the intervals at which the camera will be activated by the fingers 46 engaging the trigger 47 of the camera. The timing belt 45 may be mounted on the pulleys 39 and 43 which will increase the rate of travel of the belt in the same direction when the motor 27 is reversed through switch 30.

The camera trigger might be moved in a vertical direction to activate the camera, in which event the animator would be mounted in the position shown in FIG. 1. Should the movement of the trigger be in a horizontal direction the animator would be mounted in the position shown in FIG. 2.

In operation, switch 29 is moved causing motor 27 to rotate, power being furnished by the battery 28. The motor 27 rotates gear 31 which is meshed with and rotates gear 33. Gear 35 being on the same shaft as gear 33 in turn rotates gears 36 and 38, which are mounted on the shaft 37 together with pulley 39. When the belt 45 is mounted on pulley 39 and pulley 43 it is driven by the pulley 39 and the fingers 46 engage the trigger 47 causing the camera 22 to be activated. To decrease the speed of travel of the belt 45, the belt may be mounted on pulleys 42 and 43, in which event the motor 27 is reversed by moving switch 30.

The animator may be moved vertically and horizontally so that the fingers on the belt 45 will engage the trigger of any camera regardless of its shape or size or the direction of movement of its trigger. When the animator is in the position shown in FIG. 2 the bolt 25 extends through the slot 14 in the vertical portion 13 of the L-shaped bracket and is secured by the nut 26. When in the position shown in FIG. 1, the bolt 15 extends through the slot 14 and is secured by the nut 16.

It is to be understood that this invention is not to be limited by the exact embodiment of the device shown, which is merely by way of illustration and not limitation, as various other forms of the device will be apparent to those skilled in the art without departing from the spirit of the invention or scope of the claims.

I claim:

A camera animator comprising a housing adapted to be mounted adjacent a motion picture camera having an activating trigger, a pair of driving pulleys mounted on said housing, reduction gears on said housing connected to said driving pulleys for rotating said pulleys in opposite directions at different speeds, an idler pulley mounted on said housing, a timing belt mounted on one of said driving pulleys and said idler pulley, projecting fingers on said belt positioned to engage said trigger, a motor on said housing connected to said gears and a switch connected to said motor for changing its direction of rotation when said timing belt is mounted on the other of said driving pulleys and said idler pulley.

References Cited

UNITED STATES PATENTS

| | | | |
|---|---|---|---|
| 2,912,896 | 11/1959 | Allen et al. | 352—84 |
| 2,966,093 | 12/1960 | Applegate | 352—84 |
| 3,120,160 | 2/1964 | Hammer | 352—19 |

FOREIGN PATENTS 505,558  8/1930  Germany.

JULIA E. COINER, *Primary Examiner.*
NORTON ANSHER, *Examiner.*